United States Patent
Chan et al.

(10) Patent No.: US 7,336,318 B2
(45) Date of Patent: Feb. 26, 2008

(54) SYNTHETIC INSERTION OF CLEAR CODES DURING VIDEO PROGRAM CHANGES

(75) Inventors: Alexander C. Chan, Auburn, MA (US); Steven M. Bolduc, Oxford, MA (US)

(73) Assignee: ATI Technologies Inc., Markham, Ontario (CA)

( * ) Notice: Subject to any disclaimer, the term of this patent is extended or adjusted under 35 U.S.C. 154(b) by 203 days.

(21) Appl. No.: 09/957,991

(22) Filed: Sep. 21, 2001

(65) Prior Publication Data

US 2003/0058366 A1    Mar. 27, 2003

(51) Int. Cl.
*H04N 7/00* (2006.01)

(52) U.S. Cl. .................. 348/473; 348/474; 348/461; 348/465; 348/478

(58) Field of Classification Search .............. 348/473, 348/474, 476, 477, 478, 479, 468, 465, 461; *H04N 7/00*
See application file for complete search history.

(56) References Cited

U.S. PATENT DOCUMENTS

| | | | | | |
|---|---|---|---|---|---|
| 5,572,260 A | * | 11/1996 | Onishi et al. | ............... | 348/460 |
| 5,745,184 A | * | 4/1998 | Neal | ........................... | 348/468 |
| 5,913,009 A | * | 6/1999 | Kuboji et al. | ................. | 386/68 |
| 5,959,687 A | * | 9/1999 | Dinwiddie et al. | ......... | 348/564 |
| 6,002,447 A | * | 12/1999 | Rumreich et al. | .......... | 348/606 |
| 6,393,204 B2 | * | 5/2002 | Setoguchi et al. | .......... | 386/111 |

\* cited by examiner

*Primary Examiner*—Trang U. Tran
(74) *Attorney, Agent, or Firm*—Vedder Price P.C.

(57) ABSTRACT

An apparatus and method for facilitating program changes. The apparatus and method include a controller for detecting a change program request and for outputting change event data when a change event is detected. A non-active video information replacement module is coupled to the controller for receiving non-active video information and the change event data. When the replacement module receives change event data, a clear code generator generates clear code data that replaces non-active video information, and the non-active video information replacement module generates modified non-active video information. The modified non-active video information is provided to an output stage, whereupon the clear code data resets a non-active video information field within a display device, thereby preventing the display of erroneous information by a display within the output stage. Thereupon, clear code data is synthetically inserted within non-active video information upon the occurrence of a change event.

29 Claims, 4 Drawing Sheets

SYNTHETIC INSERTION OF CLEAR CODES DURING VIDEO PROGRAM CHANGES

FIELD OF THE INVENTION

The present invention relates generally to video program display systems and more particularly to video program display systems that display non-active and active video information.

BACKGROUND OF THE INVENTION

When a television, computer or other display device receives an input signal, such as a cable feed or Digital Versatile Disc (DVD) stream, this input is processed by a processing device, such as a television set-top box or other suitable device. Included within the input signal is active video information and non-active video information, such as closed captioning or extended data service information. The input signal is processed on a field-by-field basis and provided to a display device, such as a television. The active video information is displayed, wherein the non-active video information may be displayed or used for other internal processes within the set-top box or the display. For example, close captioning may be displayed on the television screen, if the user has enabled the feature. Irrespective of the users activation of extended features related to the non-active video information, a conventional set-top box typically provides this information to the display device in conjunction with the active video information.

Due to synchronization problems with the processing of the video information, the input signal is divided into active video information and non-active video information, then recombined once a full field has been processed. A problem arises due to the manner in which the non-active video information is processed, in light of the active video information. Should a program change event occur, such as a channel change, the display will simply receives the non-active video information from the new field, without receiving a notification of the change event. Therefore, the previous field non-active video information is not cleared, but rather the new field non-active video information is received as the next input. In a situation where a first channel has closed captioning data within the non-active video information and the channel is then changed, if the new channel does not have closed captioning data, the display will not reset the field and will continue to display the close captioning box from the previous channel. Typically, an internal 16-second timeout interval will eventually cause the display to be cleared from the screen. However, the viewer has already been presented with erroneous data.

Consequently, there is a need for a command processing system whereupon when a program change event is detected, the non-active video information is corrected to correspond to the updated status.

DETAILED DESCRIPTION OF A PREFERRED EMBODIMENT OF THE INVENTION

Briefly, a system and method facilitates program changes through the detection of a program change event, the generation of change event data, and the replacement of specific non-active video information with clear code data in response to the change event data. Furthermore, the clear code data is then provided to a display, such as a television. For example, in the case where a channel change has occurred and the second channel does not have closed captioning data, there exists a need to insert a clear code to reset and remove the display of the closed captioning field on the television, or other output device, eliminating the 16-second interval for the automatic time-out.

Generally, a controller is used to detect when a program change request has been initiated and the controller also outputs change event data. The incoming input stream is parsed into a non-active video information stream and an active video information stream. The non-active video information is provided to a non-active video information replacement module, wherein the non-active video information replacement module also receives the change event data from the controller. Upon the reception of the change event data, clear code data is generated and replaced within the non-active video information to create modified non-active video information. Finally, the modified non-active video information is recombined with the active video information and provided to an output stage. A display device within the output stage receives the modified non-active video information and clears an internal field within the display, wherein the internal field routinely receives the non-active video information.

Figure 1:
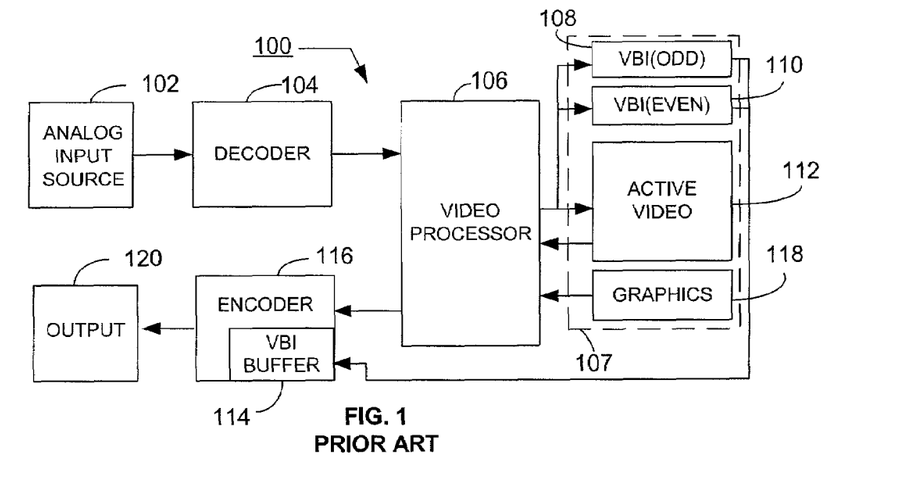
FIG. 1 illustrates a schematic block diagram of a prior art analog video processing system, such as a standard set-top box.

Referring now to FIG. 1, a prior art video processing system 100 is illustrated. The system 100 receives an input signal from an analog input source 102, such as a standard analog cable feed. This input signal is then provided to a decoder 104, which decodes the analog signal on a field-by-field basis. The decoded field is provided to a video processor 106 that parses the decoded signal into components of the active video information and the non-active video information, otherwise commonly known as vertical blanking interval information.

Figure 2:
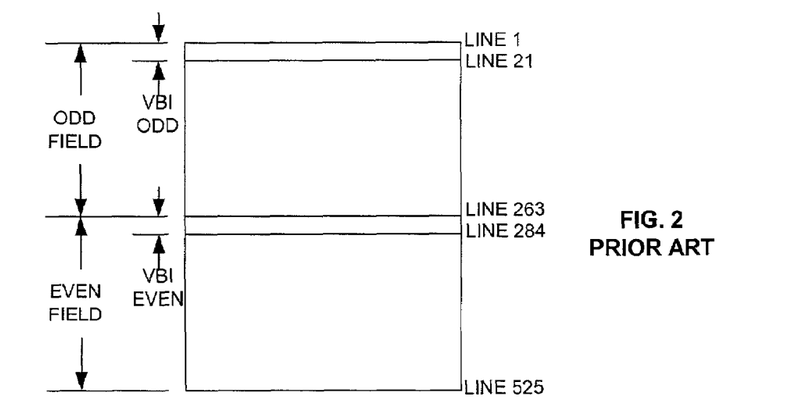
FIG. 2 illustrates a graphical representation of a video field, having active video information and non-active video information contained therein within the NTSC formatting.

FIG. 2 illustrates a graphical representation of a single video field comprising active video information and non-active video information within the NTSC formatting. In this example, the field consists of 525 lines of data, delineated into an odd field and an even field. The odd field is composed of lines 1 through 262 of data and the even field is composed of lines 263 to 524. The non-active video information, vertical blanking interval information (VBI), is contained to the first 22 lines of each field, more specifically written to lines 7 through 21. Furthermore, the active video information is written in the odd field extending from lines 22 to 262 and in the even field extending from lines 286 to line 524. It is well known within the art that the closed captioning information is located on line 21 and the extended data service information is located on line 284 within the NTSC formatting.

Moreover, FIG. 2 provides an illustration of the vertical blanking interval information within the NTSC formatting. Other well-known video and data formats contain closed captioning data and extended data service, with which present invention is directed, also exist but are not illustrated in FIG. 2. For example, it is well known that PAL/SECAM formatting consisting of 625 lines of data with the closed caption information contained on line 22 and the extended data service on line 335.

Referring back to FIG. 1, the video processor 106 provides the active and non-active video information to a video memory 107, wherein the video memory consists of a set of buffers. The odd vertical blanking interval information is provided to an odd vertical blanking interval information buffer 108 and the even vertical blanking interval information is provided to an even vertical blanking interval information buffer 110. Furthermore, the video processor 106 provides the active video information to an active video buffer 112.

The contents of the vertical blanking interval information odd buffer 108 and the vertical blanking interval information even buffer 110 are provided to a vertical blanking interval information buffer 114 within an encoder 116. Due to the synchronization, the video processor 106 must provide the non-active video information to a buffer, such as 108 or 110, while the active video information is processed and written to the active video buffer 112. Once all the active video information has been provided to the active video buffer, it may then be provided to the encoder 116, via the video processor 106, wherein the field may be reassembled and the vertical blanking interval information encoded therein.

Also, FIG. 1 illustrates a graphics buffer 118 having graphics information contained therein. This graphics information may be combined with the active video information from the active video buffer 112 within the video processor 106 and provided to the encoder 116. The encoder 116 combines the non-active video information from the vertical blanking interval information buffer 114 and the active video information and graphics information, and provides the encoded output signal to a display 120, such as a television. FIG. 1 illustrates a typical prior art set-top box used in conjunction with an analog input cable signal.

Figure 3:
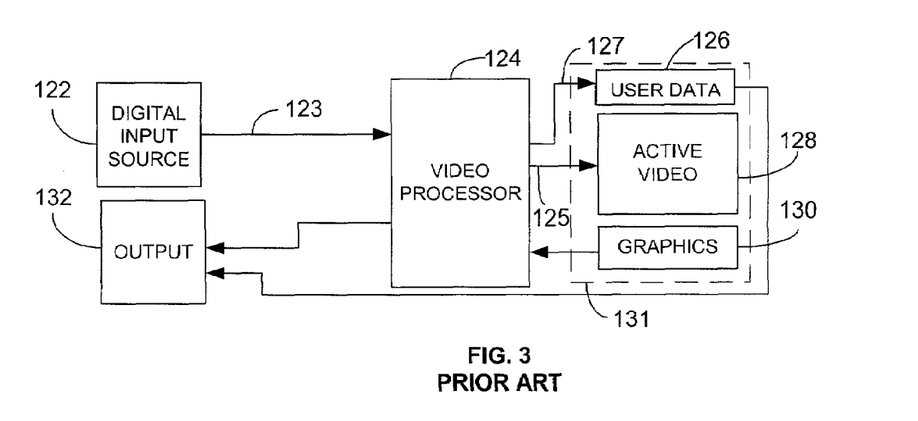
FIG. 3 illustrates a prior art digital processing system.

FIG. 3 illustrates a prior art video processing system having a digital input source 122. The input source provides an input signal 123 to a video processor 124, the processor parses the input signal 123 into active video information 125 and user specific data 127, such as timing and program rating information for a DVD movie. The processor 124 provides the user specific data 127 to a user data buffer 126 and the active video information 125 to an active video buffer 128. Similar to the prior art system of FIG. 1, the processing system of FIG. 3 also has a graphics buffer 130 which may contain graphics information. The user data buffer 126, active video buffer 128 and graphics buffer 130 are disposed within a video memory 131.

Once the video processor 124 has processed a full data field, such as the field of FIG. 2, the contents of the video memory within the video buffer 128 are provided back to the video processor 124, along with the graphics information, which is then further provided to an output source 132, such as a high-definition television (HDTV) display or a computer monitor. Concurrently, the user data within the user data buffer 126 is also provided to the output device 132.

In both processing systems illustrated in FIG. 1 and FIG. 3, the video processors, 106 and 124, act as a pass-through terminal processing an input to produce outputs for the output device. The processing systems simply extract the non-active video information, such as vertical blanking interval information or user data, from the input signal and provide this information to the output device. Neither system has the ability to detect when a change event, such as user initiated channel change, has occurred and adjust the non-active video information accordingly. More specifically, the processing system fails to provide a proper synchronization pulse to prevent the erroneous display in incorrect non-active video information.

Figure 4:
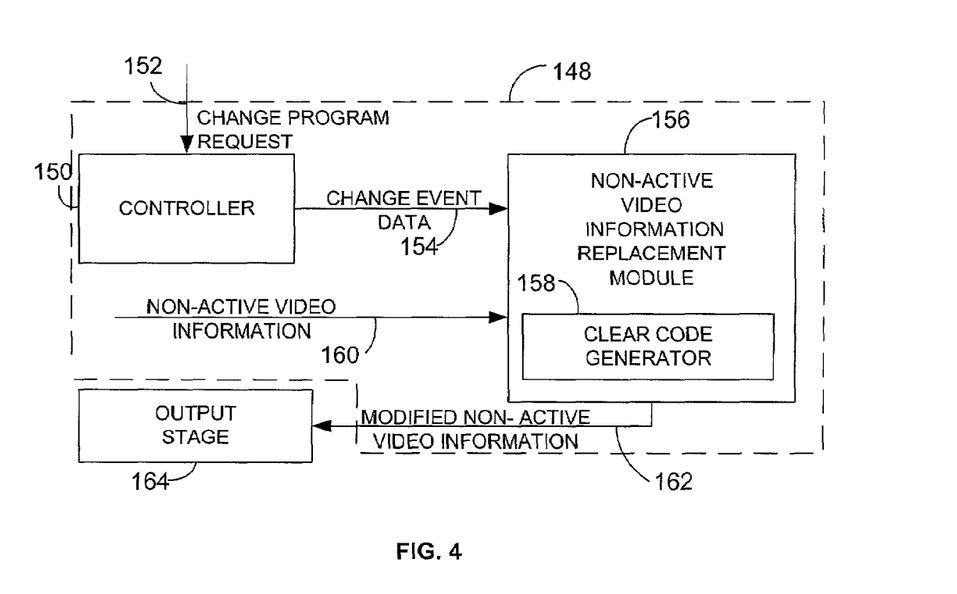
FIG. 4 illustrates a schematic block diagram of a processing system in accordance with one embodiment of the present invention.

The present invention is more fully described with reference to FIGS. 4 through 7. FIG. 4 illustrates one example of a processing system 148 that overcomes the above-noted deficiencies relating to a video processing module. The processing system 148 has a controller 150 that receives a change program request 152. This change program request 152 is provided by the system processor related to the set-top box, such as when a user changes the viewing channel, switches between different input sources, or any other change wherein a new field from a different input source is to be processed. A typical set-top box having the ability to generate a program change event may be a Motorola DCT5000, manufactured Motorola, Inc. When the controller 150 receives the change program request 152, the controller 150 produces change event data 154, which is then provided to a non-active video information replacement module 156.

The non-active video information replacement module 156 also receives non-active video information 160, which may be provided from a video processor or any other suitable source. The non-active video information replacement module 156 has a clear code generator 158 contained therein. Upon receiving the change event data 154, the clear code generator 158 within the non-active video information replacement module 156 generates clear code data and replaces, i.e. overwrites, the non-active video information 160 with the clear code data, such as "0x80, 0x80, 0x80, 0x80, 0x80, 0x80, 0x94, 0x2C, 0x94, 0x2C, 0x80, 0x80, 0x80, 0x80" to produce modified non-active video information 162.

The modified non-active video information 162 is then provided to an output stage 164, where the clear code data resets the data field previously activated by the previous non-active video information, thereby preventing any erroneous display of non-active video information. The non-active video information replacement module may be implemented in firmware or in combination with software programming running on a system processor.

Figure 5:
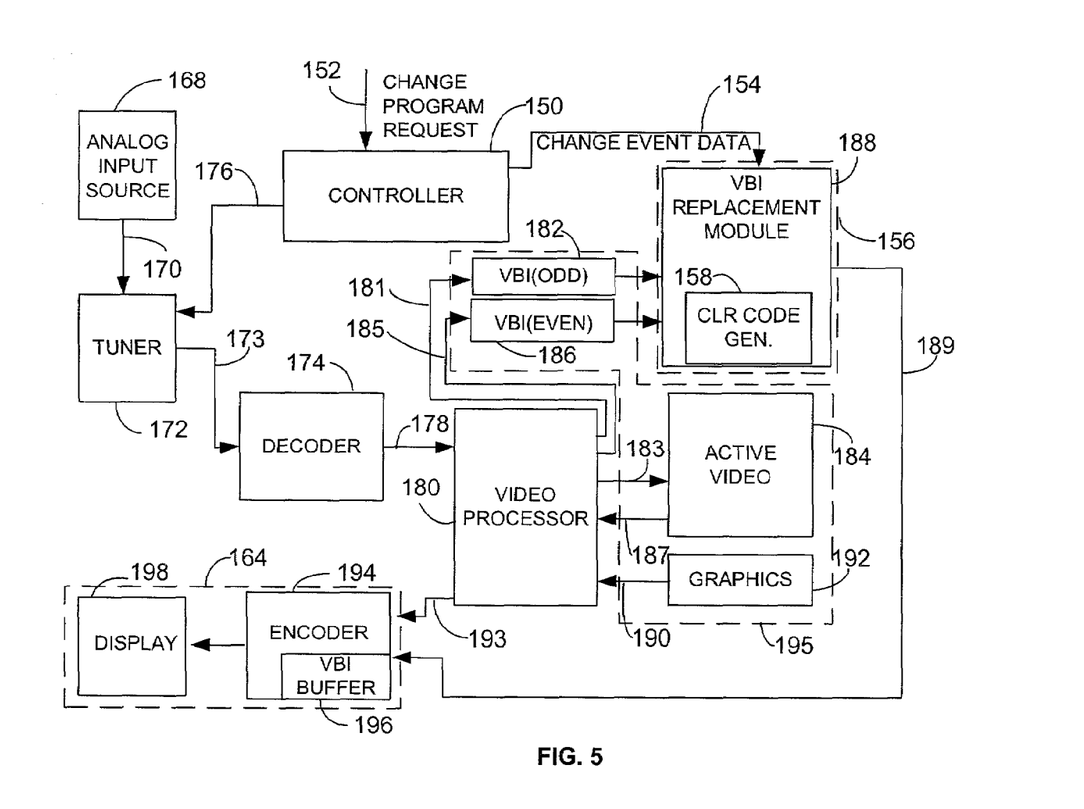
FIG. 5 illustrates a schematic block diagram of a processing system, in accordance with one embodiment of the present invention, having an analog input source.

FIG. 5 illustrates the system of FIG. 4, having an analog input source 168 that provides an analog signal 170 to a tuner 172. In the example of the input source 170 being a standard analog television cable feed, the tuner 172 tunes the incoming analog signal and provides the channel-specific analog signal 173, i.e. the television channel the viewer intends to see on the television screen, to a decoder 174. As is known in the art, this channel-specific information within the channel-specific analog signal 173 is a continuous stream of information contained in discrete packets defining individual fields, see FIG. 2. The controller 150 controls the tuner 172 and which channel-specific signal 173 is provided to the decoder 174 (and eventually which channel is displayed).

Where the change program event is a channel change, a viewer may input a command via remote control or by depressing a channel-changing button or GUI on the set top box. This activates the change program request 152, which is provided to the controller 150. The controller 150 thereupon provides a channel change command 176 to the tuner 172, such that the tuner 172 shall change the channel-specific signal 173 that is provided to the decoder 174.

The decoder 174 decodes the analog signal, specifically decoding the signal on a field-by-field basis. Each individual field within the analog signal is decoded into its base components of active video information and non-active video information, such as vertical blanking interval information. As the analog information is decoded, converted from analog into digital format, the decoder provides the decoded output 178 to a video processor 180.

The processor 180 parses the video field information and provides lines 1 through 21 of vertical blanking interval information 181 to a VBI (Odd) buffer 182, lines 22 through 262 of active video information 183 to an active video buffer 184, lines 263 through 285 to of vertical blanking interval information 185 to a VBI(Even) buffer 186 and lines 286 through 524 to the active video buffer 184. The VBI(Odd) buffer 182 and the VBI(Even) buffer 186 provide the vertical blanking interval information to an non-active video information replacement module 156, such as a VBI replacement module 188. As recognized by one of skill in the art, the above lines numbers for the active and non-active video information are based on NTSC encoded, whereas with PAL or SECAM encoding, the non-active video information is disposed on lines 1-22 and 312-333 and the active video information is disposed on lines 23-311 and 334-625.

The vertical blanking interval information replacement module 188 is also operably coupled to the controller 150. When a change program request 152, such as a channel change, is provided to the controller 150, the controller also generates and sends change event data 154 to the vertical blanking interval information replacement module 188. A clear code generator 158 within the VBI Replacement Module 188 generates clear code data and replaces the specific vertical blanking interval information with the clear code data. For example, a clear code of 0x80, 0x80, 0x80, 0x80, 0x80, 0x80, 0x94, 0x2C, 0x94, 0x2C, 0x80, 0x80, 0x80, 0x80, may be written to line 21 and 0x83, 0x01, 0x6D, 0x8F, 0x85, 0x01, 0xC8, 0xC8, 0xDB, 0x8F, 0x01, 0x83, 0x6D, 0x8F, 0x01, 0x85, 0x6B, 0x8F, 0x01, 0x07, 0xE9, 0x8F, 0x01, 0x89, 0x67, 0x8F, 0x01, 0x0B, 0xE5, 0x8F, 0x01, 0x0D, 0xE3, 0x8F may be written to line 284 or line 33. Thereby, modified non-active video information 189 is created, wherein the modified non-active video information 189 consists of the vertical blanking interval information with the replacement of specific fields, such as line 21 or 22, or line 284 or 335, and clear code data written therein.

Once all of the active video information and non-active video information of the individual field has been processed by the video processor 180 and provided to the respective memory buffers 182, 184 and 186, the active video information within the active video buffer 184 is provided back 187 to the video processor 180, along with any graphics information 190 from a graphics buffer 192. The video processor 180 then provides the active video and graphics information 193 to an encoder 194, within the output stage 164. The encoder further contains a vertical blanking interval information buffer 196 for receiving the modified non-active video information 189 from the vertical blanking interval information replacement module 188. The encoder 194 reassembles the video 193 and modified non-active video information 189 and provides it to a display 198, such as a television screen. Moreover, the combination of odd and even vertical blanking interval buffers, 182 and 186, the active video buffer 184 and the graphics buffer 192 is a video memory 195.

The clear codes within the modified non-active video information 189 contain a vertical blanking interval information reset command for use by the display 198. This clear code is provided to a specific register within the display, wherein the clear code provides a reset of the internal register. For example, if the display device was displaying closed captioning data received from the vertical blanking buffer 196, the television display would not only display the characters for the viewer, but also be expecting a next character input with the processing of each individual field. If the change program request 152 directed the tuner 172 to adjust which channel specific information is provided to the decoder 174, and the non-active video information for the new channel failed to contain close-captioning data, the buffer within the television screen would still be expecting the next closed captioning input, i.e. line 21.

Usually, the internal register in the display device will hold the last position until an internal 16-second time out period occurs. The modified non-active video information 184 resets the close captioning field upon the processing of the first field of the new channel, thus avoiding the 16 second time-out interval and thereby preventing the display of erroneous vertical blanking interval information from a previous channel. The erroneous vertical blanking interval information may also be displayed during a multiple channel change scenario where a first new channel provides a synchronization code notifying the internal register within the display to expect closed captioning information. Upon the change to a second channel which does not have closed captioning information, the vertical blanking interval information will contain codes directed to this effect, but instead the register will attempt to read these codes as closed captioning information and once again display erroneous data.

Figure 6:
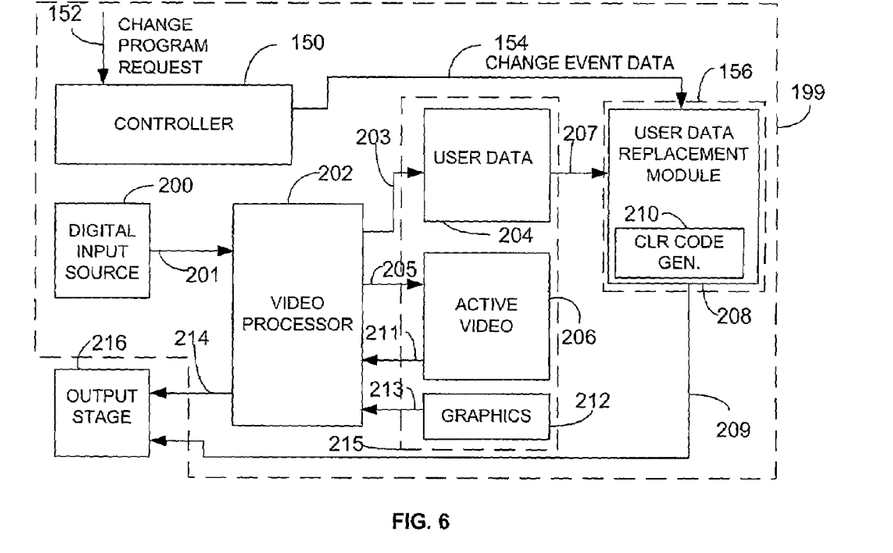
FIG. 6 illustrates a schematic block diagram of a processing system, in accordance with one embodiment of the present invention, having a digital input source.

FIG. 6 illustrates a processing system 199 having a digital input source, rather than an analog input source, as illustrated in FIG. 5. A digital input source 200 provides a digital input signal 201, such as a DVD signal or a digital video cable feed, to a video processor 202. The processor 202 parses the digital signal into its base components of user data and active video information. The user data 203, otherwise referred to as non-active video information, such as timing information or program rating information, is provided to a user data buffer 204 while the active video information 205 is provided to an active video buffer 206. It is further noted that a digital cable input feed may also contain requisite closed captioning and extended data service information, capable of being reset by synthetic insertion of clear codes, similar to an analog input feed.

The system of FIG. 6 also contains a controller 150 which receives a program change request 152 when a change event occurs, i.e. a channel change or switching DVD input signals. Upon a program change request 152 occurring, the controller 150 generates change event data 154 and provides the change event data 154 to a non-active video information replacement module 156, such as a user data replacement module 208. The user data buffer 204 provides the user data 207 stored therein, to the user data replacement module 208.

Upon receipt of change event data 154, a clear code generator 210, within the user data replacement module 208, generates clear code data. The user data replacement module then replaces the user data with the clear code data to generate modified user data 209.

When the processor 202 has processed all of the active video information for a specific field, the active video buffer 206 provides the active video information 211 back to the video processor 202. Furthermore, a graphics buffer 212 may provide specific graphics information 213 to the processor 202 wherein the graphics information is to be displayed concurrently with the active video information 211. The video processor then provides the combination of the active video information and graphics information 214 to an output stage 216. The user data replacement module 210 provides the modified user data 209 to the output 216 which utilizes the modified user data 209, in combination with the active video information and graphics information 214, to provide the proper output to the output device, such as a high definition television display (HDTV), standard television display, a computer processor, etc. Moreover, the combination of the user data buffer 204, the active video buffer 206 and the graphics buffer 212 create a video memory 215.

Figure 7:
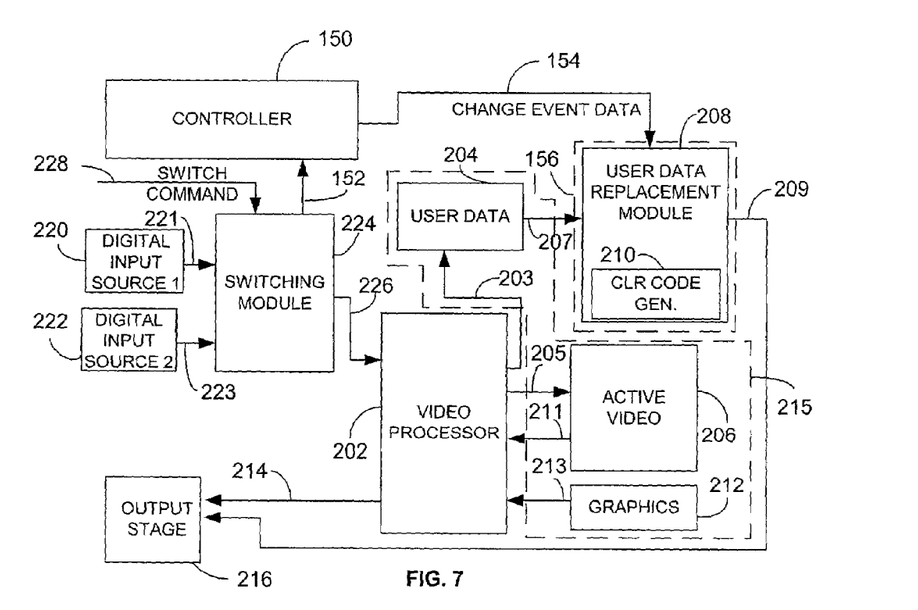
FIG. 7 illustrates a schematic block diagram of a video processing system, in accordance with one embodiment of the present invention, having dual digital input sources.

FIG. 7 illustrates a schematic diagram of the system of FIG. 6 having a first digital input source 220 providing a first digital input signal 221 and a second digital input source 222 providing a second digital input signal 223 to a switching module 224. The switching module consists of a device capable of toggling between multiple input sources, such as a manually operated dial or a computer programmed switching routine and simply provides a single output signal 226 to a video processor 202. For example, if the switching module 224 is set to provide the first digital input signal 221 as the output signal 226, the first digital input signal 221 would be provided to the video processor 202. Moreover, the first and second digital input signals, 221 and 223, may be provided from the same digital input source and filtered into multiple streams prior to being provided to the switching module 224.

If the switching module 224 receives a switch command 228, such as a user changing a toggle switch or activating a GUI on a set-top box, the output signal 226 provided to the video processor 202 may be alternated. For example, if the video processor 202 were to be receiving a digital input signal 226 from the first digital input source 202, and a switch command 228 occurred, the switching module 224 would now provide the output signal 226 from the second digital input source 222 to the processor 202.

Similar to the processing system 198 of FIG. 6, the video processor 202 parses the input signal into its base components of non-active video information, user data 203, and active video information 205. The processor provides the user data 203 to the user data buffer 204 and the active video information to the active video buffer 206.

When a switch command 228 is provided, either through manual operation or by the system within which the processing system of FIG. 7 resides, such as a television set-top box, the switching module 224 alternates the input source 226 it provides to the video processor 202. A change program request 152 is provided to the controller 150. FIG. 7 provides the switch command to be generated by the switching module 228. It is within the scope of the present embodiment for the change program request 152 to be generated by other means, such as the set-top box, and provided to the controller directly, as illustrated in FIG. 6. Upon receiving a change program request 152, the controller 150 produces change event data 154 and provides this data 154 to the user data replacement module 208.

The user data replacement module receives the change event data 154 from the controller 150. The user data replacement module also receives the user data 207 from the user data buffer 204. Similar to the system 199 of FIG. 6, a clear code generator 210 generates clear code and replaces specific user data fields with the clear code. The user data replacement module generates modified user data 209 and provides this data 209 to an output stage 216

Once all of the active video information for a particular video field has been processed, the active video buffer 206 provides the active video information 211 to the video processor 202. Also, a graphics buffer 212 may provide graphics information 213 to be combined with the active video information 211. The video processor 202 provides the combined active video information and graphics information 214 to the output stage 216. The output stage 216 receives both the video and graphics information and modified user data information, such that the output device is provided with the proper user data information.

With regards to the switching module of FIG. 7, the output stage 216 may contain a television display connected to a DVD player, whereupon a user switched from a first DVD movie to a second DVD movie on a single disc. An internal register within the display device may contain specific information relating to the DVD movie, such as program ratings information or track timing information. The modified user data 209 generated by the user data replacement module 208 will automatically reset the internal fields within the display prior to erroneous data, or erroneous programming, being displayed.

Another advantage of the present invention may be realized with a set-top box having parental control settings relating to user data ratings information wherein a parent may prohibit a child from viewing a program having a specific rating. In an input signal, a program rating may be disposed within the non-active video information. The non-active video information replacement module will automatically reset the non-active video information fields upon a change event. Therefore, should a person attempt to switch to an input source, such as a television cable channel, having contents with a prohibited rating, the non-active video information from the previous channel will be automatically reset to prevent erroneous or unwanted non-active video information, or specifically prohibited active video information, from being displayed.

Figure 8:
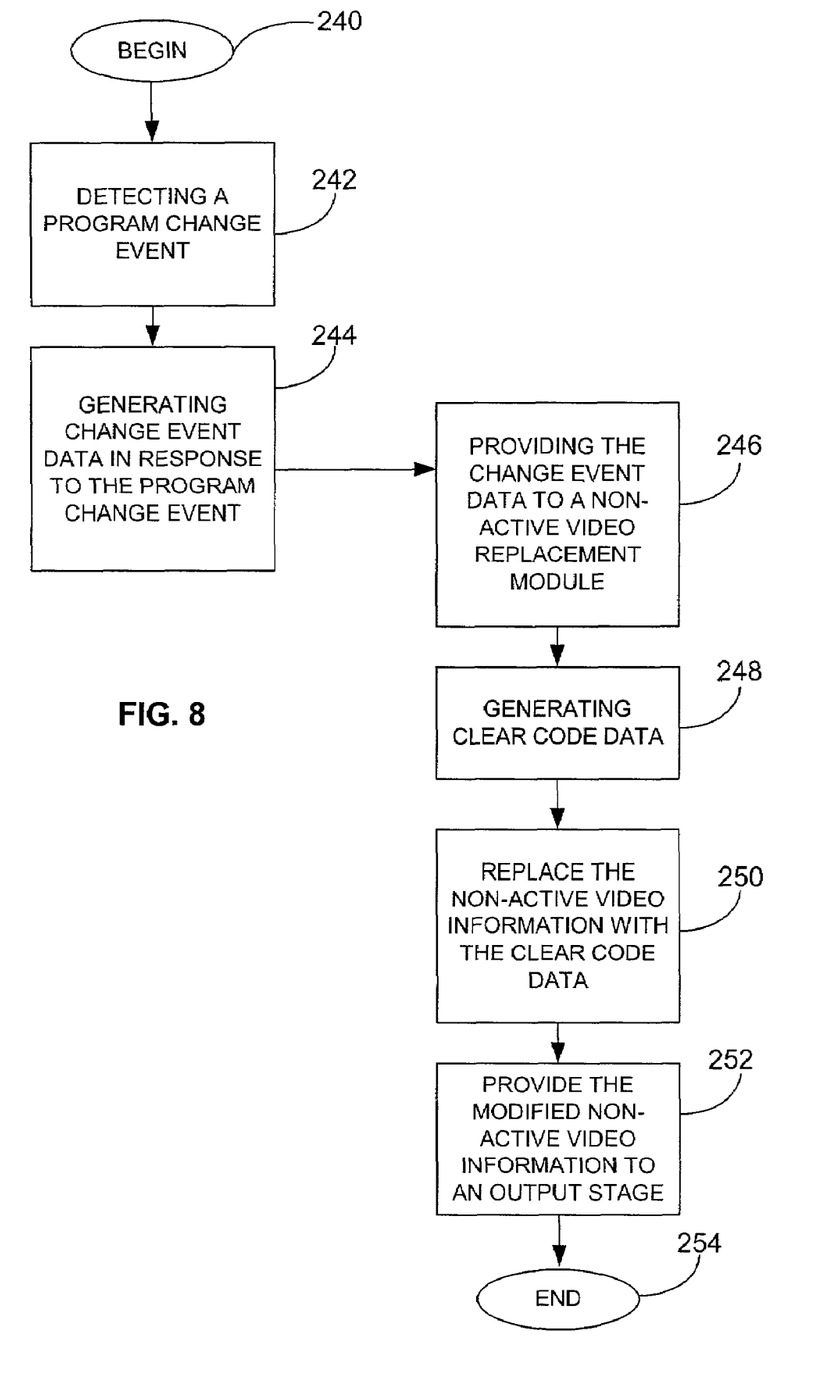
FIG. 8 illustrates a flow chart representing the steps for the facilitation of program changes in accordance with one embodiment of the present invention.

FIG. 8 illustrates a flow chart designating steps for facilitating program changes, with reference to the processing system of FIG. 4. The process begins 240 with the detection of a program change event, designated at step 242. The controller 150 receives a change program request 152 from the native system, such as a set-top box. Once the program change event has been detected, the controller 150 generates change event data 154, designated at step 244. Thereupon, the controller 150 provides the change event data 154 to a non-active video replacement module 156, designated at step 246.

When the embedded non-video replacement module receives the change event data, a clear code generator 158 within the non-active video replacement module generates clear code data, designated at step 248. Once the clear code data has been generated, the non-active video replacement module replaces the non-active video information with the clear code data, generating modified non-active video information 162, designated at step 250. The modified non-active video information is then provided to an output stage 164 having a display, such as a television monitor (not shown in FIG. 4), designated at step 252. Whereupon, the modified non-active video information provided to the output stage 162 contains a clear code inserted therein, thereby preventing the placement of erroneous data within the output stage during a program change, designated at step 254.

The present invention provides for the synthetic insertion of clear code data within non-active video information upon a video program change. The present invention provides for elimination of the display of erroneous data upon an output device, such as a television display, without requiring an internal time-out to reset the display. With the display of vertical blanking interval information line 21, closed captioning, information, the present invention provides for the automatic reset of a data register within a display device upon a channel change. Should a channel change occur, and the new channel fail to provide closed captioning information, the present invention automatically eliminates the prior closed captioning data from the television display, obviating a viewer from having to wait for an internal time-out to reset these data fields.

It should be understood that the implementation of other variations and modifications of the invention in its various aspects as may be readily apparent to those of ordinary skill in the art and that the invention is not limited by the specific embodiments described herein. It is therefore contemplated that the present disclosure is to cover any and all modifications, variations, or equivalents that fall within the spirit and scope of the basic underlying principles disclosed and claimed herein.

What is claimed is:

1. A method for facilitating program changes, the method comprising:
   detecting a program change event;
   generating change event data in response thereto; and
   replacing received non-active video information with clear code data based on the change event data prior to providing the received non-active video information to an output stage, wherein the clear code data is utilized to produce modified non-active video information.

2. The method of claim 1 further comprising:
   providing the clear code data to a display or to a display interface or processor within the output stage.

3. The method of claim 1 wherein the non-active video information is vertical blanking interval information directed to closed captioning information or extended data service information.

4. The method of claim 3 wherein the clear code data is a reset command for vertical blanking interval information line 21 or line 22.

5. The method of claim 3 wherein the clear code data is a reset command for vertical blanking interval information line 284 or line 335.

6. The method of claim 1 wherein the clear code data resets a data field previously activated by previous non-active video information.

7. A method for facilitating program changes, the method comprising:
   processing active video information and non-active video information;
   detecting a program change event;
   generating change event data in response thereto;
   replacing received non-active video information with clear code data based on the change event data, wherein the clear code data is utilized to produce modified, non-active video information; and
   providing the active video information and the modified, non-active video information to a display device prior to an automatic timeout reset period.

8. The method of claim 7, wherein the non-active video information is vertical blanking interval information.

9. The method of claim 8, wherein the clear code data is a reset command for vertical blanking interval information line 21, line 22, line 284 or line 333.

10. The method of claim 7 wherein the non-active video information is user-specific information relating to the active video information.

11. An apparatus for facilitating program changes, the apparatus comprising:
    a controller for detecting a change program request and outputting change event data; and
    a non-active video information replacement module operably coupled to the controller for receiving non-active video information and the change event data, wherein clear code data is generated and replaces the non-active video information to create modified, non-active video information, wherein the clear code data is utilized to produce the modified, non-active video information.

12. The apparatus of claim 11 further comprising:
    an output stage operably coupled to the embedded non-video replacement module for receiving the modified, non-active video information.

13. The apparatus of claim 11 further comprising:
    a video processor which receives an input signal, wherein the video processor parses the input signal into active video information and the non-active video information;
    a video memory coupled to the processor wherein the active video information is stored; and
    an output stage operably coupled to the video processor and the non-active video information replacement module for receiving the modified, non-active video information and the active video information from the video memory.

14. The apparatus of claim 13 further comprising:
    an analog input source providing an analog input signal;
    a tuner operably coupled to the analog input source and the controller, wherein the tuner receives the analog input signal and a control signal from the controller and outputs a tuned signal; and
    a decoder operably coupled to the tuner for receiving the tuned signal, wherein the decoder converts the tuned analog signal into digital format and provides the input signal to the video processor.

15. The apparatus of claim 14 wherein the non-active video information is vertical blanking interval information containing close captioning information and extended data service information.

16. The apparatus of claim 14 wherein the output stage comprises:
    an encoder which receives the active video information from the video memory; and
    a buffer for receiving the modified non-active video information from the non-active video information replacement module wherein the encoder combines and encodes the active video information and the modified non-active video information to be provided to a display.

17. The apparatus of claim 13 further comprising:
    a digital input source providing a digital input signal to the video processor wherein the non-active video information is user data corresponding to the digital input source.

18. An apparatus for facilitating program changes, the apparatus comprising:
    a controller which receives a change program request and outputs change event data;

a non-active video information replacement module which receives non-active video information and the change event data, wherein a clear code is generated and replaces the non-active video information, wherein the clear code data is utilized to produce modified non-active video information; and an output stage operably coupled to the non-active video information replacement module for the reception of active video information and the modified, non-active video information.

19. The apparatus of claim 18 further comprising:

an analog input source;

a tuner receiving an input signal from the analog input source and a control signal from the controller;

a decoder operably coupled to the tuner for receiving channel information and decoding the channel information into active video information and non-active video information; and a video processor which receives and processes the active video information and the non-active video information.

20. The apparatus of claim 19 wherein the output stage comprises:

an encoder which receives the active video information from the video memory; and a buffer for receiving the modified non-active video information from the non-active video information replacement module, wherein the encoder combines and encodes the active video information and the modified non-active video information to be provided to a display or to a display interface or processor.

21. The apparatus of claim 18 wherein the non-active video information is vertical blanking interval information.

22. The apparatus of claim 21 further comprising a vertical blanking interval information buffer operably coupled to the video processor for receiving the vertical blanking interval information and providing the vertical blanking interval information to the non-active video information replacement module.

23. The apparatus of claim 22 wherein the vertical blanking interval information buffer comprises an odd vertical blanking interval information buffer and an even vertical blanking interval information buffer.

24. The apparatus of claim 23 wherein the non-active video information replacement module generates a clear code for line 21 or line 22 of the odd vertical blanking interval information or line 284 or line 335 of the even vertical blanking interval information.

25. The apparatus of claim 18 further comprising:

a digital input source providing a digital input signal to the video processor wherein the non-active video information is user data corresponding to the digital input source.

26. A method for facilitating program changes, the method comprising:

detecting a program change event;

generating change event data in response thereto; and replacing up to two lines of received non-active video information with clear code data based on the change event data prior to providing the received non-active video information to an output stage, wherein the clear code data is utilized to produce modified non-active video information.

27. The method of claim 26, wherein the clear code data includes at least "0x8."

28. The method of claim 26, wherein the clear code data is utilized to produce modified non-active video information in response to detecting multiple program change events.

29. The method of claim 26 further including providing the clear code data to a display or to a display interface or processor synchronously with active video data.

* * * * *